United States Patent [19]

Ohno

[11] Patent Number: 4,971,382
[45] Date of Patent: Nov. 20, 1990

[54] FUEL FILLER DOOR STRUCTURE FOR A VEHICLE

[75] Inventor: Moriyuki Ohno, Shizuoka, Japan

[73] Assignee: Suzuki Motor Company Limited, Shizuoka, Japan

[21] Appl. No.: 333,691

[22] Filed: Apr. 4, 1989

[30] Foreign Application Priority Data

Jul. 28, 1988 [JP] Japan ................ 63-189472

[51] Int. Cl.$^5$ .............................................. E05F 1/12
[52] U.S. Cl. .................... 296/97.22; 49/386; 16/291
[58] Field of Search ............ 296/97.22; 49/386; 16/286, 291, 293

[56] References Cited

U.S. PATENT DOCUMENTS

| | | | |
|---|---|---|---|
| 2,893,779 | 7/1959 | Bayley | 296/97.22 |
| 3,750,825 | 8/1973 | Bachle | 296/97.22 X |
| 3,785,006 | 1/1974 | Metz | 16/293 |

FOREIGN PATENT DOCUMENTS

| | | | |
|---|---|---|---|
| 1438871 | 6/1976 | United Kingdom | 296/97.22 |
| 2041070 | 9/1980 | United Kingdom | 296/97.22 |

Primary Examiner—Margaret A. Focarino
Assistant Examiner—Joseph D. Pape
Attorney, Agent, or Firm—McGlew & Tuttle

[57] ABSTRACT

A fuel filler door structure is provided with such an arrangement that one end of a toggle spring is adapted to engage with the bracket for the mount of a fuel filler door complete, and the other end of the toggle spring is adapted to engage with the middle portion of a hinge rod extending in a crank-like shape in an offset relationship with a line passing the both ends of the crank shaped hinge rod. By the effect of the toggle spring, the fuel filler door complete may be urged continuously in either way of closing or opening across the dead point of urging effected by the toggle spring.

3 Claims, 3 Drawing Sheets

FUEL FILLER DOOR STRUCTURE FOR A VEHICLE

FIELD OF THE INVENTION AND RELATED ART STATEMENT

The present invention relates to a fuel filler door structure for use in a vehicle, and more particularly to an improvement in the structure of a fuel filler door mount which is adapted in use for an automotive vehicle to close the opening provided in a vehicle's side body panel in an opposed relationship with the fuel filler pipe standing from the fuel tank of a vehicle.

In the rear part of the side body panel of an automotive vehicle, there is provided a fuel filler door or fuel lid in an opposed relationship with the fuel filler inlet or fuel supply point leading to a fuel tank, which fuel filler door is designed to be openable manually. The fuel filler door assembly is adapted to be closed to be locked normally while in the operation of a vehicle, and generally it is designed unlockable remotely from the driver's seat for the supply of fuel. More specifically, this fuel filler door is adapted to be urged continuously so as to be left open for the supply of fuel by way of, for example, a leaf spring or the like when it is manually unlocked.

According to the typical conventional construction of a fuel filler door, however, it is known that one end of the leaf spring urging the fuel filler door to be kept open is held by a bracket which is mounted separately from another bracket for the mount of the fuel filler door, and that there is provided a further mechanism for locking the fuel filler door assembly to be closed. With such an arrangement, there is inevitably a tendency that more parts are involved in use, thus making the fuel filler door structure rather complex and increasing making the number of man hours substantially. Also, in the fuel filler door structure of this type, there is generally required the provision of a reliable and effective anticorrosive measure.

In addition, according to the general conventional construction, while the fuel filler door assembly is urged to be opened, when unlocked, under the biasing effect of a spring as reviewed hereinbefore, this door assembly is actually caused to be opened only slightly by the aid of the biasing force and so it would be left in a free open state for its remaining stroke to its fully opened position, so that it would then be required to manually assist the door assembly to be opened to a fully opened position for the purpose of fuel supply. While it is possible in practice to design that the fuel filler door assembly may be urged to be opened fully from its closed position to its opened position by way of the biasing spring, it would be inevitable that the door assembly may be caused to be rotated strongly to its fully opened position, when unlocked, and so it would possibly take a substantial manual force to have it returned to its closed position to be locked, and this would naturally be awkward and inconvenient in practice.

OBJECT AND SUMMARY OF THE INVENTION

The present invention has been contemplated essentially in view of such a problem, and it is a primary object of the invention to provide an improvement in the construction of a fuel filler door for use in an automotive vehicle which can be materialized with a substantial reduction in the number of parts involved therein and in the number of man-hour required in the assembly job thereof, as well as with an advantageous effect of rust resistivity.

It is another object of the invention to provide a useful fuel filler door construction for use in an automotive vehicle which is designed to be openable to its fully opened position with the biasing force of a single spring, and which can readily be returned to its closed position with a relatively small manual force.

The construction of a fuel filler door according to the present invention which can afford the attainment of the objects noted above may be paragraphed with its essential organization, which comprises in combination the following group of elements, namely (A) a side body panel defined with an opening in an opposed relationship with respect to a fuel supply part leading downwardly to a vehicle's fuel tank;

(B) a bracket member disposed securely on the one end of the opening defined in the side body panel;

(C) a crank-shaped hinge rod mounted rotatably at its both ends onto the bracket member;

(D) a fuel filler door assembly adapted to close the opening in the side body panel in rotating motion about the hinge rod; and (E) a toggle spring mounted operatively at one end thereof to the bracket member and at the other end thereof to the middle portion of the hinge rod which is disposed in a slightly offset relationship with the line passing the both ends of the hinge rod.

According to the advantageous construction of the present invention such that the opposite ends of the toggle spring are mounted operatively to the bracket member for the mount of the fuel filler door assembly and to the hinge rod belonging to the fuel filler door complete, it is possible in practice to dispense in design and construction with a door locking mechanism adapted to have the door assembly locked in a closed position as well as with another bracket member otherwise required for the engagement with the biasing spring, thus effecting a substantial reduction in the number of parts involved therein and in the number of hours required for the assembly job thereof, as well as in the production cost, accordingly. Additionally, with the advantageous effect from the provision of the off-centered toggle spring, the fuel filler door assembly is caused to be rotated in toggled motion across the center dead point so that it may be biased continually and resiliently in either way of being closed and opened. In this manner, the fuel filler door assembly can then be opened to its fully opened position when required to supply the engine fuel through the fuel filler, as it is continuously urged to be rotated in the opening direction in an over-center motion once having passed its center dead point even if it is freed from a rotating force applied by the operator, whereby there is consequently no obstacle for the fuel supply operation at all. In contrast, when closing the fuel filler door assembly, there is attained such an advantageous effect that it can be closed to its fully closed position with a relatively small manual force, as it may automatically return to its fully closed position with the effect of a biasing force from the same spring which works in the opposite direction once having passed the center dead point, accordingly.

BRIEF DESCRIPTION OF THE DRAWINGS

The following detailed description of the invention refers to the accompanying drawings by way of a preferred embodiment thereof, wherein like parts are designated by like reference numerals, and wherein.

DETAILED DESCRIPTION OF PREFERRED EMBODIMENTS

The present invention will now be explained in detail by way of a preferred embodiment thereof in conjunction with the accompanying drawings, as follows.

Figure 1:
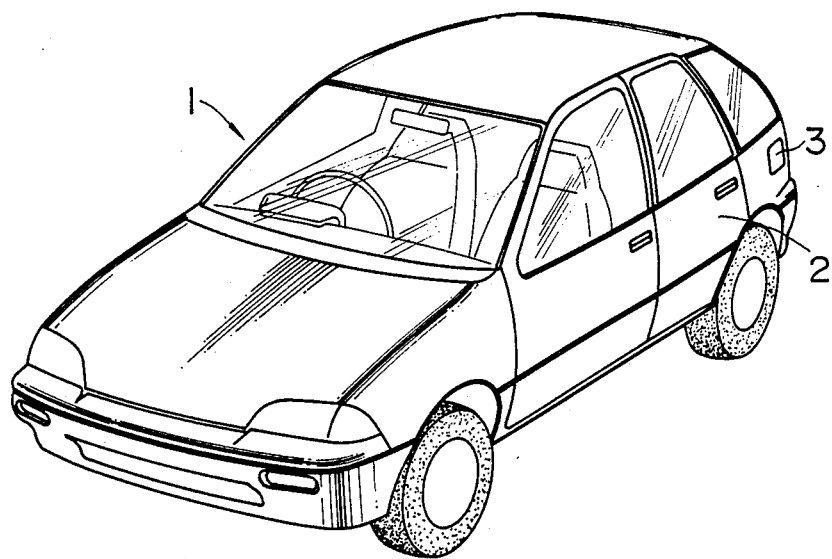
FIG. 1 is a schematic perspective view showing generally the appearance of a four-wheeled automotive vehicle.

FIG. 1 is a schematic perspective view showing generally the external appearance of a four-wheeled automotive vehicle, wherein there are seen provided a side body portion or panel designated by the reference numeral 2, and a fuel filler door assembly by the reference numeral 3, which is mounted operatively in the rear part of the side body panel 2 of the automotive vehicle. As shown generally in FIG. 3, in this rear part of the side body panel 2, there is seen defined an opening designated by 4, to which there is a fuel inlet pocket or box 5 which is disposed opposedly in position. Also provided in the inside of the fuel inlet box 5 is a tank cap (not shown) adapted to sealingly close the fuel supply inlet to a fuel tank, and in one side of the opening 4 there is mounted rotatably a fuel filler door assembly 3 on its one side in such a manner that it may be opened and closed in rotating motion about a hinge portion 6.

Figure 2:
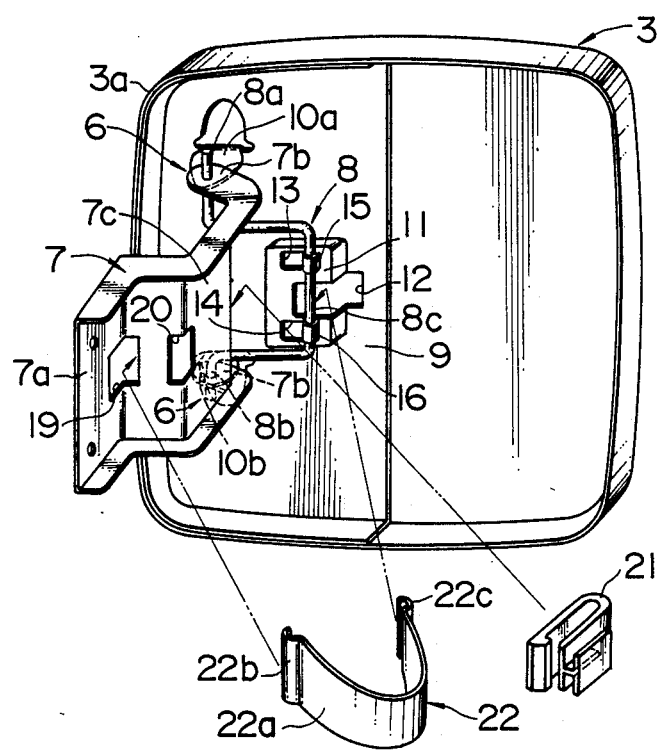
FIG. 2 is an exploded perspective view showing the general construction of a fuel filler door according to the present invention.
Figure 3:
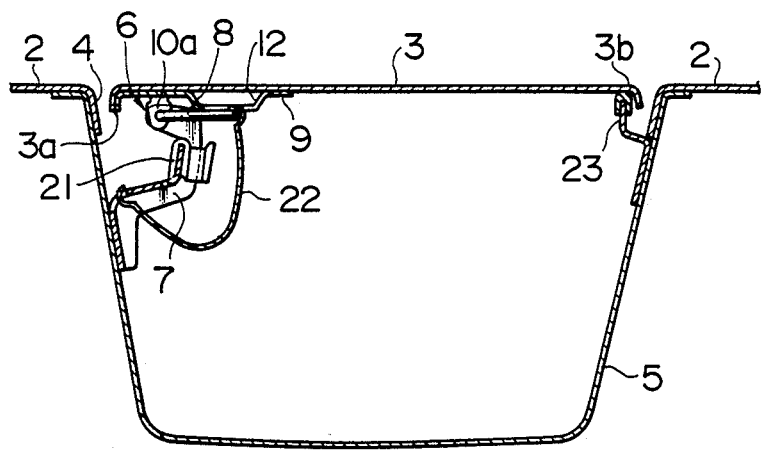
FIG. 3 is a transversal cross-sectional view showing a fuel filler door structure of the invention.
Figure 4:
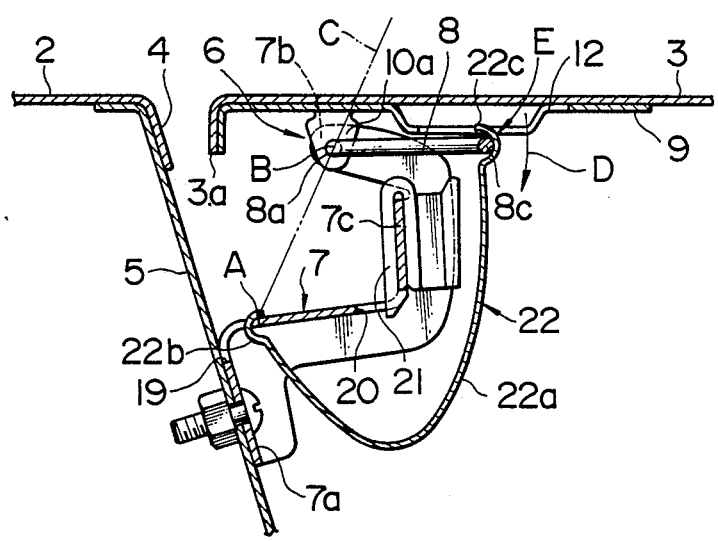
FIG. 4 is an enlarged transversal cross-sectional view showing the construction of the main parts in a fuel filler door structure.

Reviewing more specifically, there is seen provided a bracket member 7 which is fixed securely with a screw at its one end 7a in position of the fuel inlet box 5, and also in its opposite end 7b provided is a hinge rod 8 formed from a round metal rod mounted with its both ends 8a and 8b extending in a crank-like shape and being rotatable about its straight middle part 8c. As shown in FIGS. 2 through 4, there is mounted a stamped plate member 9 on the rear side of the fuel filler door assembly 3, and this plate member has a pair of tabs 10a, 10b cut and risen at the right angles from its surface in such a manner that the both ends 8a, 8b of the hinge rod 8 may rotatably extend passing through the holes defined in the tabs.

There is also provided a receiving block 11 generally in the center of the plate member 9, and in the center of this receiving block 11 there is defined a cut-out opening 12, and also defined are guide holes 13, 14 on the opposite sides of this opening. Additionally, there are provided roll bearings 15 and 16 on the opposite sides of the straight middle part 8c, that is, the middle extension of the hinge rod 8 extending in a crank-like fashion offset from the line passing the both angled ends 8a and 8b thereof, which roll bearings 15 and 16 are disposed snugly and slidably into the guide holes 13 and 14 noted above.

On the other hand, there are seen defined two openings 19, 20 on the part of the bracket member 7 to be mounted onto the side of the fuel inlet box 5, and into one of these openings 20 which is nearer the hinge rod 8, an insert or clip member 21 made of a plastic resin is inserted snugly in position on the web portion 7c of the bracket member 7 as shown in FIGS. 2 through 4. In addition, a toggle spring 22 is mounted resiliently extending across the one edge of the opening 19 defined in the bracket member 7 and the straight middle portion 8c of the hinge rod 8. This toggle spring 22 is formed in the generally U-shape from a sheet of leaf spring metal, which comprises a web portion 22a of U-shape and two engaging ends 22b, 22c curved to be a semi-circular shape in the opposite ends of the web portion 22a. This toggle spring 22 is placed resiliently across the bracket member 7 and the hinge rod 8 against the resilience from the U-shaped web portion 22a in such a manner that it may be engaged at its one engaging end 22b with the edge of the opening 19 in the bracket member and at its other engaging end 22c with the straight middle portion 8c of the hinge rod 8, respectively.

With this arrangement, it is to be noted that a line C which passes the point of engagement A of the toggle spring 22 located on the part of the bracket member 7 and the axis B of the both engagement ends 8a, 8b of the hinge rod 8 defines the dead point of toggle motion urged by the toggle spring 22. In this respect, therefore, when the fuel filler door assembly 3 is in its closed position as shown in FIG. 4, it is urged continuously into the closing direction shown by an arrow D under the biasing force effected by the toggle spring 22 about the center defined by the line passing the both engaging ends 8a, 8b of the hinge rod 8.

There is seen provided a door stopper 23 in an opposite relationship with the hinge portion 6 in the fuel inlet box 5 as shown in FIG. 3, and also provided is a thumb hole or like means to help opening of the fuel filler door (not shown) in the position opposed to this door stopper 23 in the outer surface of the fuel filler door complete 3.

When in the closed position, the point of engement E where the toggle spring 22 rests in engagement with the straight middle portion 8c of the hinge rod 8 lies on the door opening pisition off the dead point C as shown in FIG. 4, it is to be noted that the hinge rod 8 and hence the fuel filler door assembly 3 is urged in rotating motion towards the direction shown by an arrow D under the effect of biasing force from the toggle spring 22. In this condition, the opposite end 3b of the fuel filler door assembly 3 is forced abutting against the door stopper 23 so that the fuel filler door assembly 3 is held in its closed state, accordingly.

Figure 5:
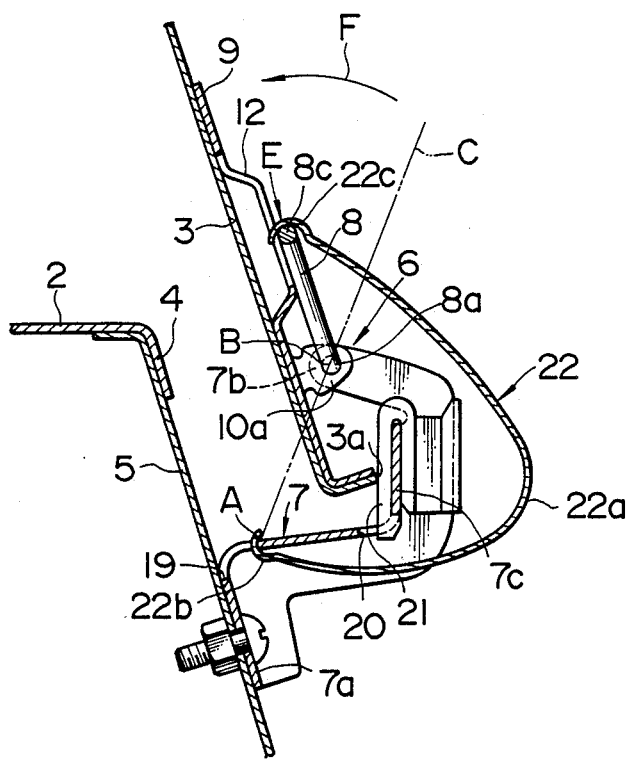
FIG. 5 is an enlarged transversal cross-sectional view similar to FIG. 4 showing the state that a fuel filler door assembly is opened to its fully opened position.

When causing the fuel filler door assembly 3 to be turned manually in the opening direction against the biasing force of the toggle spring 22 by pulling at the thumb hole or the like means, at the moment that the fuel filler door assembly 3 passes over the dead point C of the toggle spring 22, the effect of urging the door assembly at its hinge rod 8 by the toggle spring 22 may now change from the closing direction to the opening direction, whereby the fuel filler door assembly 3 is then forced to be rotated in over-center toggling motion in the direction shown by an arrow F in FIG. 5. At the end of this opening stroke, the end 3a of the fuel filler door assembly 3 may now come to contact with the clip member 21 of a plastic resin, thus stopping safely the rotating toggle motion of the fuel filler door assembly 3 in the direction F under the biasing effect from the toggle spring 22. Upon the abutting against the clip member 21, the opening motion of the fuel filler door assembly 3 may now be completed, thus having the door assembly left in its opened position, accordingly.

Now that the supply of fuel is finished, and if the fuel filler door assembly 3 is caused to be rotated in the closing direction which is opposite to the direction F shown in FIG. 5, passing the dead point C, the sense of effect that the toggle spring 22 urges upon the fuel filler door assembly 3 is changed from the opening direction to the closing direction, and then the fuel filler door assembly 3 is forced towards its closed position as it rested originally, which was stated early.

According to the advantageous construction of the fuel filler door assembly 3 provided in this manner, it is to be noted that by virtue of the mount wherein the end 22b of the toggle spring 22 is held commonly at the bracket member 7 which is designed for the mount of the fuel filler door assembly 3, there is no more need to provide any further bracket member for the purpose of holding the spring, and consequently, this arrangement may naturally result in a substantial reduction in the number of parts involved therein and the number of man-hour required for the assembly job, and hence in the production cost, accordingly. Moreover, with such an advantageous arrangement that the end 22c in curved shape of the toggle spring 22 is hooked on the straight middle portion 8c of the hinge rod 8 which is formed in offset relationship with the line passing the both ends 8b, 8c thereof, these members may be put in a surface contact relationship with each other, which may effect less chances for biting the film of paint on the vehicle's body panel which it might come to contact, and which may therefore lessen the possibility of rusting, accordingly.

In addition, with such an advantageous arrangement that the fuel filler door assembly 3 may be rotated urgingly in either way of opening and closing under the biasing effect of the toggle spring 22 in over-center fashion across the dead point C, the fuel filler door assembly 3 may be held in its fully opened position without applying any strong manual force for the supply of fuel, whereby there would remain no obstacles for the fuel supply operation. What is still more, when closing, only a less manual force would be enough to be rendered upon the fuel filler door assembly 3, accordingly. Also, as the fuel filler door assembly 3 is safely held in its closed state under the biasing effect of the toggle spring 22, there is no more need for the provision of any particular mechanism to have it locked positively.

While the description as disclosed herein is essentially directed to the improvement in a fuel filler door structure, it is to be understood that the invention is not intended to be restricted to the details of the specific constructions and arrangement of parts involved therein as disclosed typically herein, but to contrary, the invention can of course be adapted equally to any other means for a similar effect and performance in accordance with the foregoing teachings without being restricted thereto and without departing from the spirit and scope of the invention.

For instance, while the toggle spring 22 which is formed from a piece of sheet metal is employed in the stated embodiment of the present invention, this means may of course be in the form of a coil spring formed from a wire of resilient metal.

It is to be understood that the appended claims are intended to cover all of such generic and specific features as are particular to the invention as disclosed herein and all statements relating to the scope of the invention, which as a matter of language might be said to fall thereunder.

What is claimed is:

1. A fuel filler door structure for use in a vehicle which comprises, in combination:
    (A) a side body panel of the vehicle defined with an opening disposed in an opposed relationship with a fuel supply point of the vehicle's body;
    (B) a bracket disposed securely connected to one side wall portion of said opening;
    (C) a hinge rod having hinge rod portions bent to form a crank shape, each hinge rod portion lying in a common plane, said hinge rod portions forming hinge rod ends, defining a common hinge rod axis, said hinge rod ends being mounted to said bracket for rotation of said hinge rod with respect to said bracket and said hinge rod having a middle portion;
    (D) a fuel filler door assembly adapted to close said opening by rotation about said hinge rod axis of said hinge rod, said fuel filler door assembly supporting first and second roll bearings, said hinge rod middle part being mounted to said roll bearings for rotation of said middle part relative to said roll bearings; and
    (E) a toggle spring means having one end thereof engaging said bracket and having another end thereof engaging the middle portion of said hinge rod means between said first and second roll bearings, said hinge rod middle portion extending in an offset relationship with said hinge rod axis of said hinge rod.

2. A fuel filler door structure as claimed in claim 1, wherein said toggle spring means is formed in a leaf spring of generally U-shape.

3. A fuel filler door structure for use in a vehicle, comprising: a side body panel of a vehicle defined with an opening disposed in an opposed relationship with a fuel supply point of the vehicle's body; a bracket disposed securely on one side wall portion of said opening; a fuel filler door assembly; first and second roll bearings connected to an inner side of said fuel filler door assembly; a hinge rod having hinge rod portions forming a crank shape structure lying completely in a common plane, said crank shaped structure including a middle portion and spaced-apart hinge rod ends, said hinge rods defining a common hinge rod axis and said central part defining a central part axis substantially parallel to and spaced from said hinge rod axis, said central part being connected rotatably to said first and second roll bearings and said hinge rod ends being connected to said bracket for rotation of said hinge rod with respect to said bracket; a toggle spring element having one end connected to said bracket and having another end engaging said hinge rod middle portion between said first and second roll bearings.

* * * * *